(12) United States Patent
Arndt

(10) Patent No.: US 7,484,533 B1
(45) Date of Patent: Feb. 3, 2009

(54) VENT CAP AND INSPECTION CAP FITTING ASSEMBLY

(76) Inventor: Norman Arndt, N. 4656 Pieper Rd., Weyerhaeuser, WI (US) 54895

( * ) Notice: Subject to any disclaimer, the term of this patent is extended or adjusted under 35 U.S.C. 154(b) by 0 days.

(21) Appl. No.: 11/487,087

(22) Filed: Jul. 17, 2006

(51) Int. Cl.
*F16L 55/10* (2006.01)

(52) U.S. Cl. ............... 138/96 R; 138/89; 454/367; 285/42; 215/307

(58) Field of Classification Search ......... 138/96 R, 138/96 T, 89; 454/368, 367, 8; 285/42, 43; 220/325, 376; 215/307, 309
See application file for complete search history.

(56) References Cited

U.S. PATENT DOCUMENTS

| | | | | |
|---|---|---|---|---|
| 230,952 A * | 8/1880 | Mark | ............... | 454/199 |
| 2,210,996 A * | 8/1940 | Woods | ............... | 220/287 |
| 2,494,679 A * | 1/1950 | Ward, Jr. | ............... | 220/372 |
| 3,031,783 A * | 5/1962 | Burke | ............... | 40/660 |
| 3,363,538 A * | 1/1968 | Stoneman et al. | ............... | 454/3 |
| D214,501 S | 6/1969 | Eklund | ............... | D23/393 |
| 3,884,134 A * | 5/1975 | Jordan | ............... | 454/10 |
| 4,147,096 A * | 4/1979 | Caswell | ............... | 454/20 |
| 4,372,585 A * | 2/1983 | Evora | ............... | 285/43 |
| 4,392,584 A * | 7/1983 | Bauer | ............... | 220/374 |
| 4,397,225 A * | 8/1983 | Patton | ............... | 454/368 |
| 4,399,743 A * | 8/1983 | Izzi, Sr. | ............... | 454/367 |
| 4,909,135 A * | 3/1990 | Greko | ............... | 454/368 |
| D336,952 S | 6/1993 | Raneo | ............... | D23/393 |
| 5,662,522 A | 9/1997 | Waltz | ............... | 454/359 |
| 5,749,780 A * | 5/1998 | Harder et al. | ............... | 454/359 |
| D428,130 S | 7/2000 | Zirk | ............... | D23/393 |
| 6,155,008 A | 12/2000 | McKee | ............... | 52/198 |
| 6,513,550 B1 * | 2/2003 | Kwilosz | ............... | 138/96 R |
| 6,616,370 B1 | 9/2003 | Signorelli | ............... | 404/25 |
| 6,978,803 B2 * | 12/2005 | Brown et al. | ............... | 138/96 R |
| 2003/0029807 A1 | 2/2003 | Williams | ............... | 210/748 |

* cited by examiner

*Primary Examiner*—Patrick F Brinson

(57) ABSTRACT

A combined vent cap and inspection cap fitting assembly includes a top cap that has a planar top surface and a sidewall extending downward therefrom. Such cap fitting assemblies may be either air-tight or air-flow fitting assemblies depending on whether the present invention is applied inspection cap fittings or vent cap fittings respectively. A bottom cap is seated on the conduit top opening and has an outer wall engaged with the conduit that is spaced inward from the top cap outer wall such that a gap is formed therebetween, allowing ambient air to flow upwardly between the top and bottom caps outer walls, and downwardly through the bottom cap top opening and the conduit. An adapter coupling is removably mated to the conduit. The outer wall of the bottom cap terminates subjacent of the top cap sidewall.

4 Claims, 15 Drawing Sheets

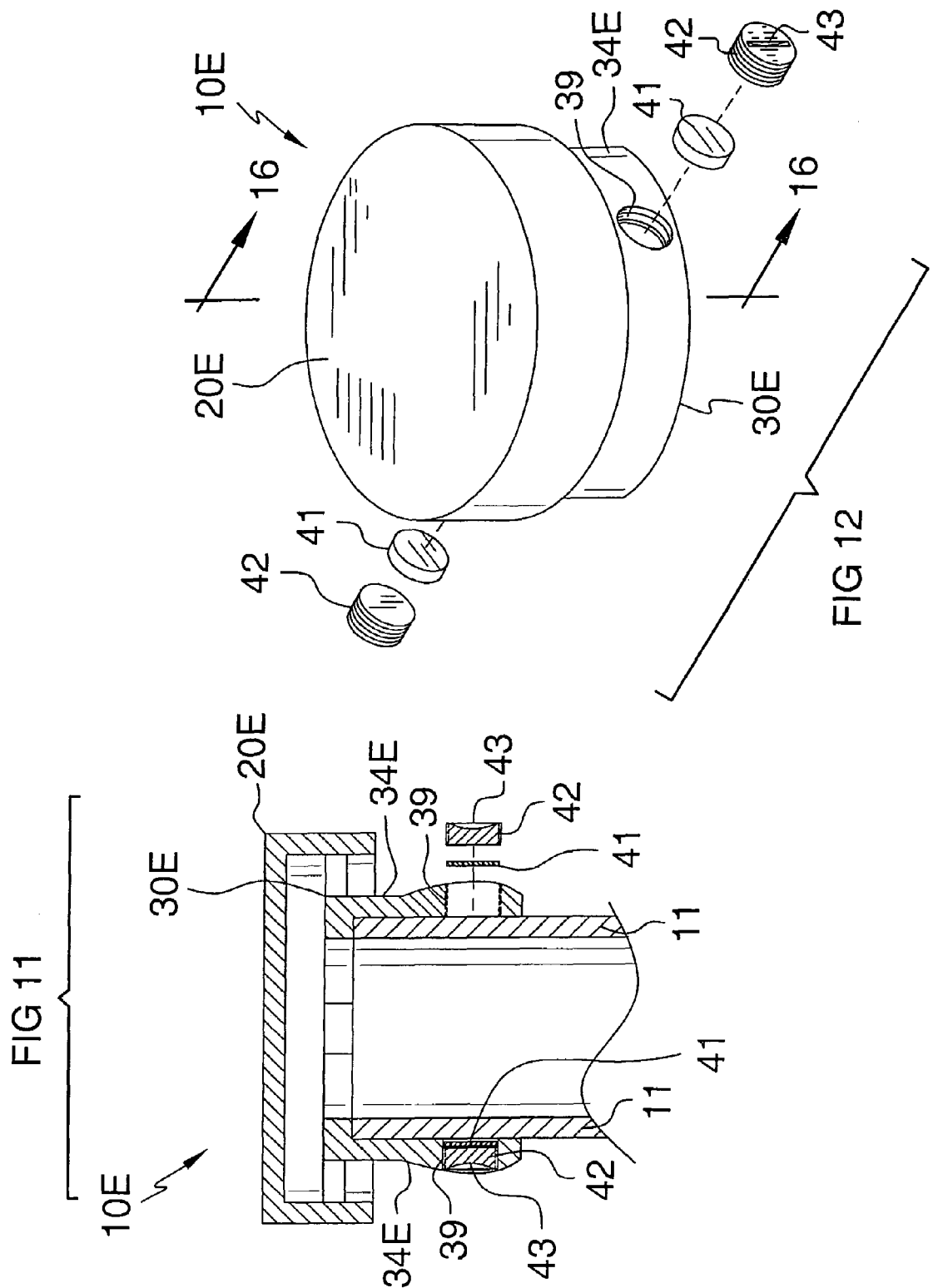

VENT CAP AND INSPECTION CAP FITTING ASSEMBLY

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to vent cap and inspection cap fittings and, more particularly, to vent cap fitting assemblies for covering holding tanks, lift pump tank chambers, drain field cells having exposed conduits for air flow as well as inspection cap fitting assemblies for covering an exposed septic tank conduit.

2. Prior Art

Inspecting a utility system, such as a septic tank, can be a difficult task. Utility workers routinely inspect, test, repair and sample the contents of such underground utility systems which are designed as subsurface structures. Utility workers generally enter or gain access to these subsurface structures through an opening at the surface that is normally covered by a panel or manhole cover. Prior to entering the underground structure atmospheric tests must be performed on the interior environment to ensure that the underground structure is safe to enter, e.g., that little or no toxic substances or combustible gases are present. The inspection may be performed with air and fluid monitors utilizing probes, tubes, etc., that may be used to gather or detect unidentified matter and gasses. Most private, on-site waste treatment systems have an inspection cap assembly attached to the exposed conduit on a septic tank. Vent cap assemblies are attached to conduits extending up from holding tanks, lift pump tanks, and drain field cells. Also, conventional septic systems have a vent conduit through which the testing equipment can easily be lowered in order to acquire quick and accurate readings.

To gain access to the interior environment, the vent conduit must be located to permit the entry of probes, tubes or other devices therethrough. Locating such a vent can be rather time-consuming since the vents typically become overgrown with vegetation like grasses, shrubs, or other plants. Furthermore, upon finding the vent, the utility worker must often struggle with a tight fitting and difficult to remove end cap that is attached thereto. Oftentimes the end cap is stuck tightly to the vent due to foreign matter such as dirt, rocks, etc. This situation requires specialized tools to pry open or pound the end cap, thereby breaking the seal caused by the foreign matter, so that the end cap can be successfully dislodged or removed from the vent conduit.

Accordingly, a need remains for an end cap fitting assembly in order to overcome the above-noted shortcomings. The present invention satisfies such a need by providing an end cap fitting assembly that is easy to install in a secure manner and can quickly be removed. The plastic design thereof makes it durable, while also reducing the production costs thereof. The ornamental designs attached to the top of the end cap helps to disguise the septic system components, while allowing the vent conduit to be easily located.

BRIEF SUMMARY OF THE INVENTION

In view of the foregoing background, it is therefore an object of the present invention to provide an end cap fitting assembly. These and other objects, features, and advantages of the invention are provided by an end cap fitting for effectively covering an exposed septic tank conduit.

The end cap fitting includes a top cap provided with a diameter greater than a diameter of the conduit. Such a top cap has a planar top surface spaced above a top opening of the conduit and further has an annular sidewall extending vertically downwardly from the top surface. The sidewall is equidistantly and outwardly spaced about an entire outer perimeter of the conduit.

A bottom cap is directly seated on the top opening of the conduit and is centrally registered beneath the top cap. Such a bottom cap has an outer wall directly engaged with the conduit. The outer wall of the bottom cap is equidistantly spaced inward from the outer wall of the top cap such that a gap is formed therebetween for effectively allowing ambient air to flow upwardly between the outer walls of the top and bottom caps respectively and thereafter downwardly through the open top opening of the bottom cap and the conduit respectively. The outer wall of the bottom cap terminates subjacent of the sidewall of the top cap.

The bottom cap preferably includes an inner wall provided with a plurality of stop members protruding radially towards a center thereof. Such stop members are monolithically formed with the inner wall and are equidistantly spaced therealong. The bottom cap may further be provided with a plurality of linear slots equidistantly extending radially inwardly towards the inner wall of the bottom cap. Such slots are contiguously juxtaposed about an entire circumference of the bottom cap such that an even flow of ambient air effectively permeates therethrough. An interior cavity of the conduit is in fluid communication with the ambient air while the end cap fitting is directly mounted on the conduit.

In an alternate embodiment, the outer wall of the bottom cap may be directly conjoined to an inner wall of the conduit. The bottom cap has a flanged shoulder seated over a top edge of the conduit that terminates at the outer perimeter of the conduit such that the flanged shoulder is flush with the outer perimeter of the conduit.

In a further embodiment, the bottom cap preferably includes a plurality of fingers that are monolithically formed with the outer wall thereof. Such fingers are equidistantly spaced about the outer perimeter of the bottom cap and protrude radially outward therefrom. Each of the fingers is directly abutted against the inner wall of the top cap.

In another embodiment, the top cap may further include a threaded lid that is removably engaged with the top surface of the top cap. Such a threaded lid has a square boss monolithically formed therewith that protrudes axially away from the conduit such that an operator can conveniently remove the threaded lid and advantageously access an interior of the conduit while the top and bottom caps are engaged with the conduit.

In yet another embodiment, the top cap may include a threaded lid that is removably engaged with the top surface of the top cap. Such a threaded lid has a square boss monolithically formed therewith that protrudes axially away from the conduit such that an operator can conveniently remove the threaded lid and advantageously access an interior of the conduit while the top and bottom caps are engaged with the conduit. The outer wall of the bottom cap may be directly conjoined to an inner wall of the conduit. Such a bottom cap has a flanged shoulder seated over a top edge of the conduit that terminates at the outer perimeter of the conduit such that the flanged shoulder is flush with the outer perimeter of the conduit.

In a further alternate embodiment, the bottom cap is preferably provided with a pair of diametrically opposed apertures formed in the sidewall thereof. Such apertures pass through an entire thickness of the sidewall and are disposed subjacent to the top cap such that the operator can conveniently and effectively access the apertures while the top cap is situated over the bottom cap. The bottom cap further includes a pair of coextensively disc-shaped gaskets that are removably positioned into the apertures and are directly engageable with the outer perimeter of the conduit. A pair of coextensively shaped threaded plugs are removably affixed directly with the apertures respectively such that the pair of gaskets are intercalated between the outer perimeter of the conduit and the pair of plugs respectively. Each of the plugs has a linear slit formed therein for advantageously allowing the operator to unscrew the pair of plugs by employing a screwdriver.

In an additional embodiment, the bottom cap is provided with a threaded aperture for receiving a threaded shaft therein.

In another alternate embodiment, the bottom cap may include first and second annular sleeves that have axially opposed top and bottom ends. Such first and second annular sleeves are directly and concentrically coupled to the top cap such that a continuous and circular gap is formed between the first and second annular sleeves for effectively receiving the conduit therebetween.

In yet another alternate embodiment, the assembly preferably further includes an adapter coupling that is directly mated to the conduit and is removably attachable to the bottom cap such that the bottom cap is intercalated between the top cap and the adapter coupling respectively. Such an adapter coupling has an inwardly stepped lower shoulder effectively receiving the bottom cap thereon. The inner shoulder has first and second diameters larger and smaller than the diameter of the bottom cap respectively such that the bottom cap is advantageously prohibited from penetrating beyond the second diameter.

In yet a further alternate embodiment, the adapter coupling may have an outwardly stepped lower shoulder for effectively receiving the bottom cap thereon.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 11 is a cross-sectional view showing a further alternate embodiment of the assembly shown in FIG. 2, in accordance with the present invention;

FIG. 12 is a partially exploded perspective view of the further alternate embodiment shown in FIG. 11;

DETAILED DESCRIPTION OF THE INVENTION

Figure 1:
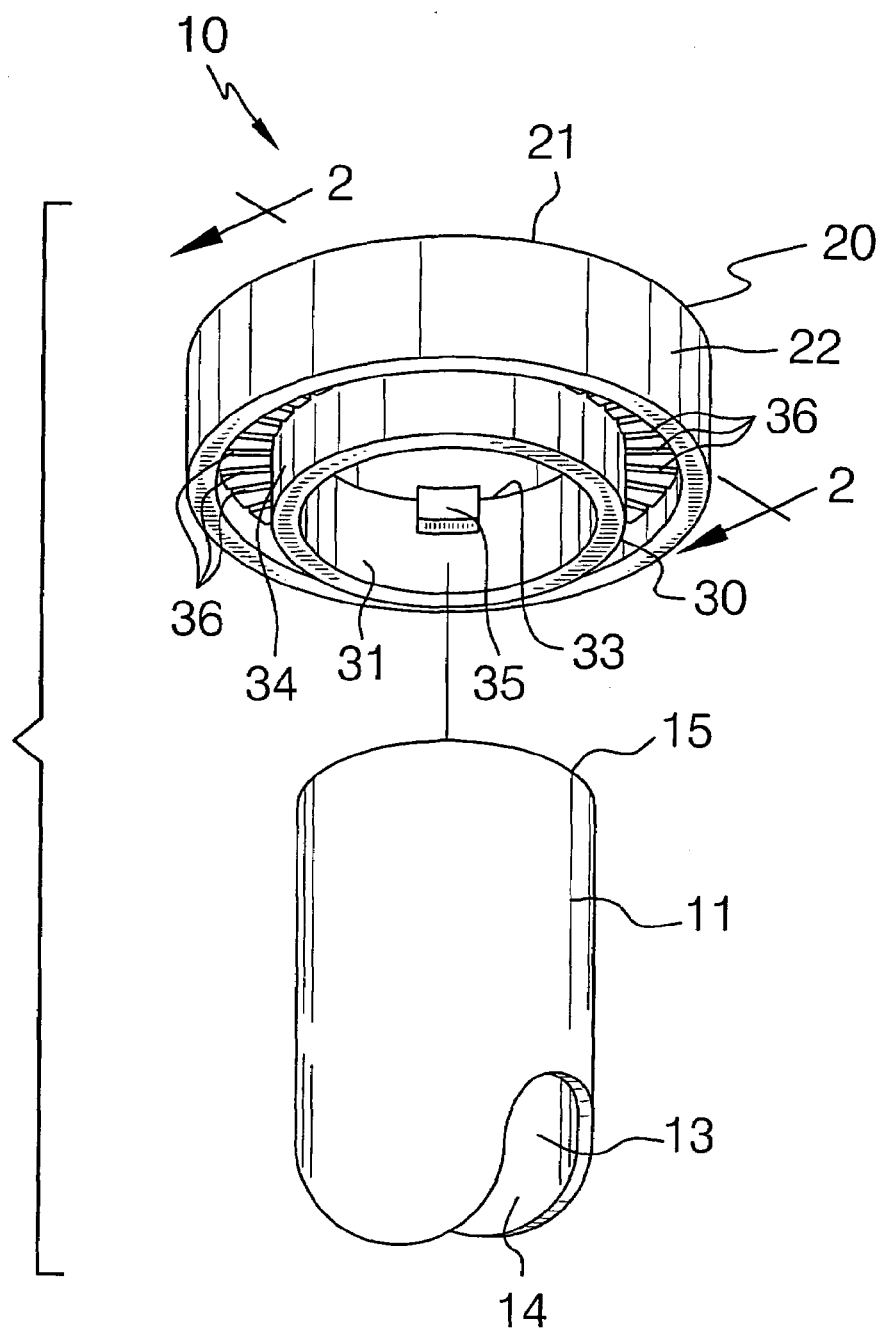
FIG. 1 is a perspective view showing an end cap fitting assembly, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and alphanumeric numbers refer to various alternate embodiments of such elements.

The assembly of this invention is referred to generally in FIGS. 1-21 by the reference numeral 10 and is intended to provide an end cap fitting assembly. It should be understood that the assembly 10 may be used to cover many different types of exposed conduits and should not be limited in use to only covering septic system conduits.

Referring initially to FIGS. 1, 2, 4 and 5, the assembly 10 includes a top 20 cap provided with a diameter greater than a diameter of the conduit 11. Such a top 20 cap has a planar top surface 21 spaced above a top opening 12 of the conduit 11 and further has an annular sidewall 22 extending vertically downwardly from the top surface 21. The sidewall 22 is equidistantly and outwardly spaced about an entire outer perimeter of the conduit 11. Of course, the sidewall 22 may be produced in a variety of vertical heights depending on the application of the assembly 10, as is obvious to a person of ordinary skill in the art.

Figure 4:
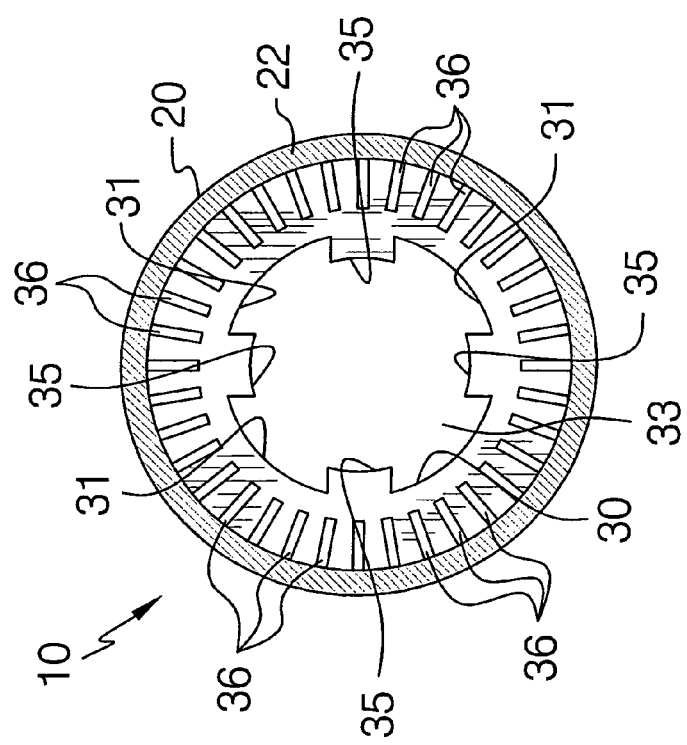
FIG. 4 is a cross-sectional view of the assembly shown in FIG. 2, taken along line, and showing the stop members and linear slots of the bottom cap.

Still referring to FIGS. 1, 2, 4 and 5, a bottom cap 30 is directly seated, without the use of intervening elements, on the top opening 12 of the conduit 11 and is centrally registered beneath the top cap 20, as is best shown in FIGS. 1 and 4. Such a bottom cap 30 has an inner wall 31 directly engaged, without the use of intervening elements, with the conduit 11. The outer wall 34 of the bottom cap 30 is equidistantly spaced inward from the sidewall 22 of the top cap 20, which is essential such that a gap 32 is formed therebetween for effectively allowing ambient air to flow upwardly between the sidewall 22 and outer wall 31 of the top 20 and bottom 30 caps respectively and thereafter downwardly through the open top openings 33, 12 of the bottom cap 30 and the conduit 11 respectively. The outer wall 31 of the bottom cap 30 terminates subjacent of the sidewall 22 of the top cap 20.

Again referring to FIGS. 1, 2, 4 and 5, the bottom cap 30 includes an inner wall 31 provided with a plurality of stop members 35 protruding radially towards a center thereof. Such stop members 35 are monolithically formed with the inner wall 31 and are equidistantly spaced therealong. The bottom cap 30 is further provided with a plurality of linear slots 36 equidistantly extending radially inwardly towards the inner wall 31 of the bottom cap 30. Such slots 36 are contiguously juxtaposed about an entire circumference of the bottom cap 36, which is crucial such that an even flow of ambient air effectively permeates therethrough. An interior cavity 13 of the conduit 11 is in fluid communication with the ambient air while the end cap fitting 10 is directly mounted, without the use of intervening elements, on the conduit 11.

Figure 2:
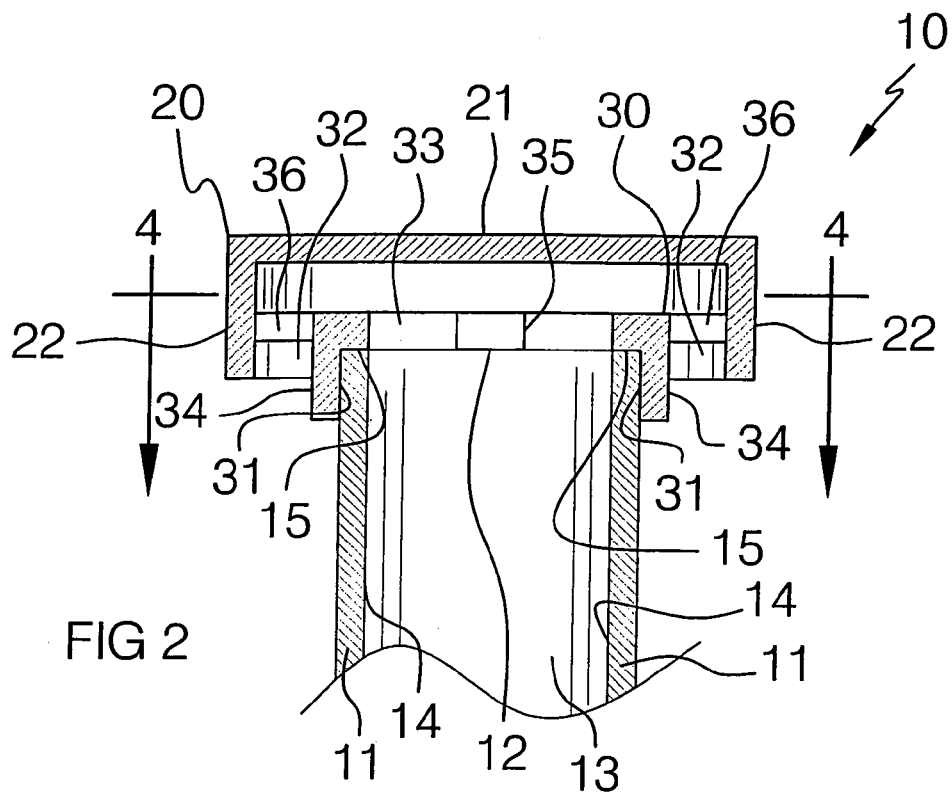
FIG. 2 is a cross-sectional view of the assembly shown in FIG. 1, taken along line 2-2.
Figure 3:
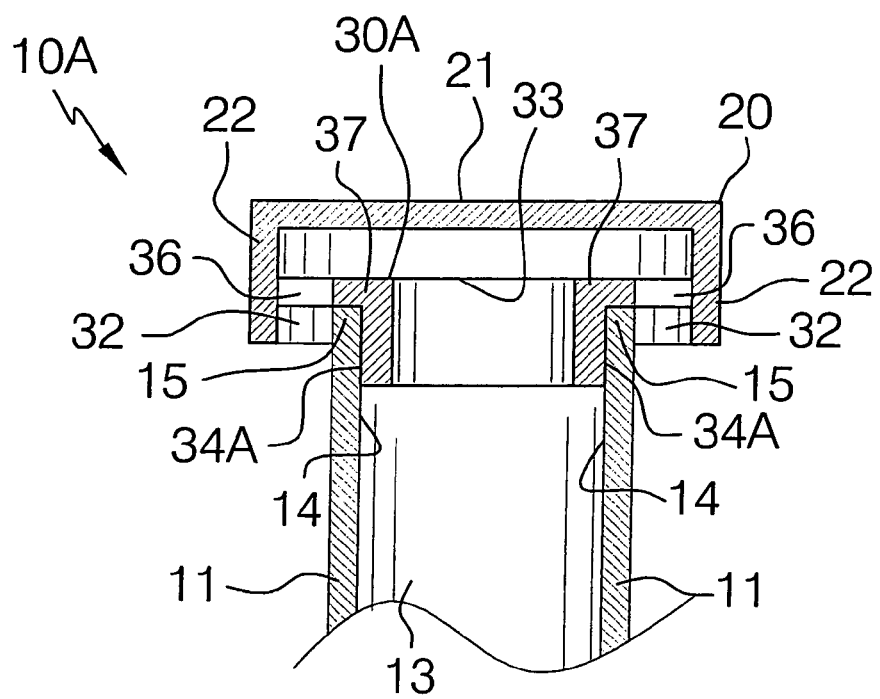
FIG. 3 is a cross-sectional view showing an alternate embodiment of the assembly shown in FIG. 1, in accordance with the present invention.
Figure 5:
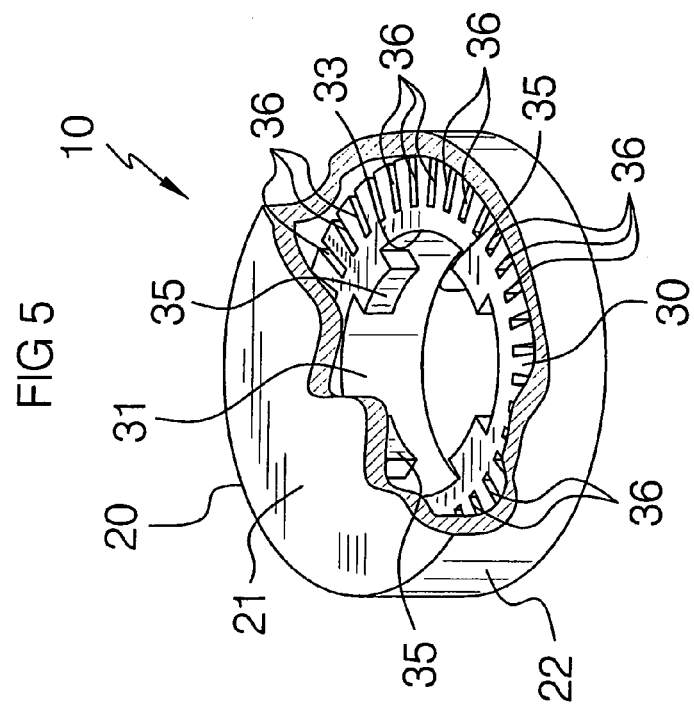
FIG. 5 is a partial cut-away top perspective view of the assembly shown in FIG. 1.

Referring to FIG. 2, in an alternate embodiment 10A, the outer wall 34A of the bottom cap 30A is directly conjoined, without the use of intervening elements, to an inner wall 14 of the conduit 11. The bottom cap 30A has a flanged shoulder 37 seated over a top edge 15 of the conduit 11 that terminates at the outer perimeter of the conduit 11 such that the flanged shoulder 37 is flush with the outer perimeter of the conduit 11.

Figure 7:
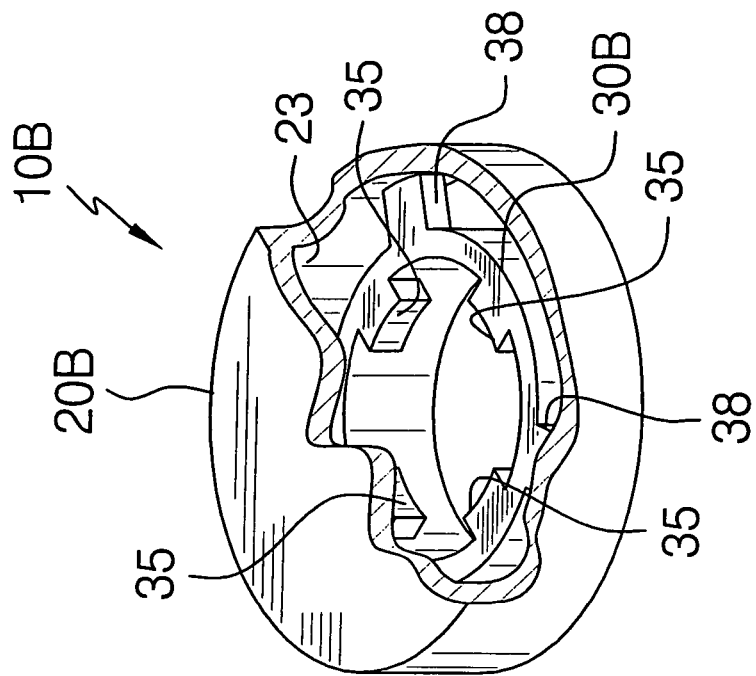
FIG. 7 is a partial cut-away top perspective view of the assembly shown in FIG. 6.
Figure 6:
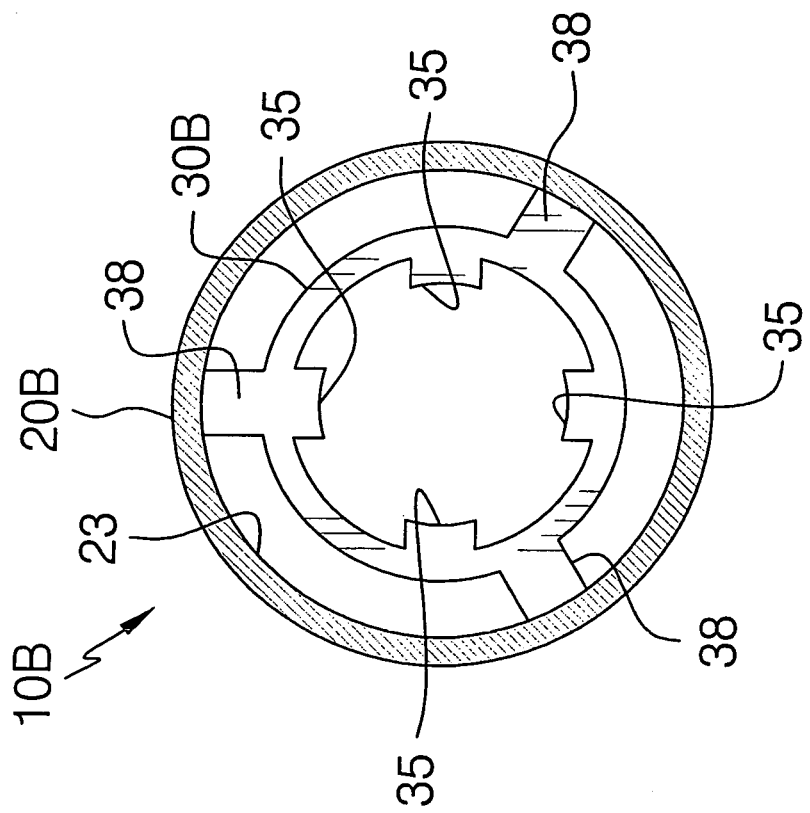
FIG. 6 is a cross-sectional view showing a further embodiment of the assembly shown in FIG. 4, in accordance with present invention.

Referring to FIGS. 6 and 7, in a further embodiment 10B, the bottom cap 30B includes a plurality of fingers 38 that are monolithically formed with the outer wall 31B thereof. Such fingers 38 are equidistantly spaced about the outer perimeter of the bottom cap 30B and protrude radially outward therefrom. Each of the fingers 38 is directly abutted, without the use of intervening elements, against an inner surface 23 of the sidewall 22 of the top cap 20B.

Figure 8:
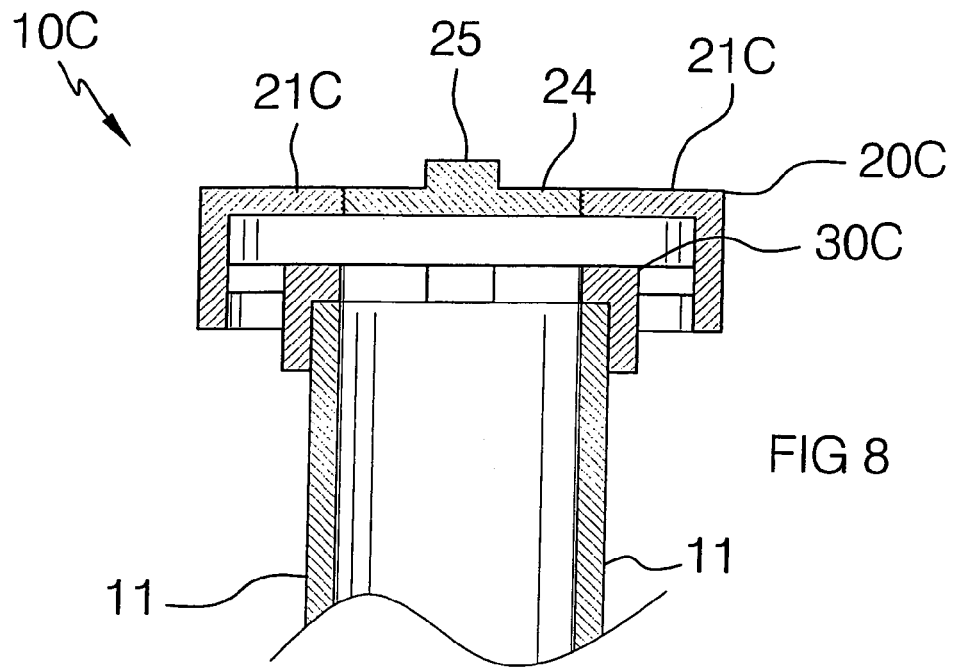
FIG. 8 is a cross-sectional view showing another embodiment of the assembly shown in FIG. 2, in accordance with the present invention.
Figure 10:
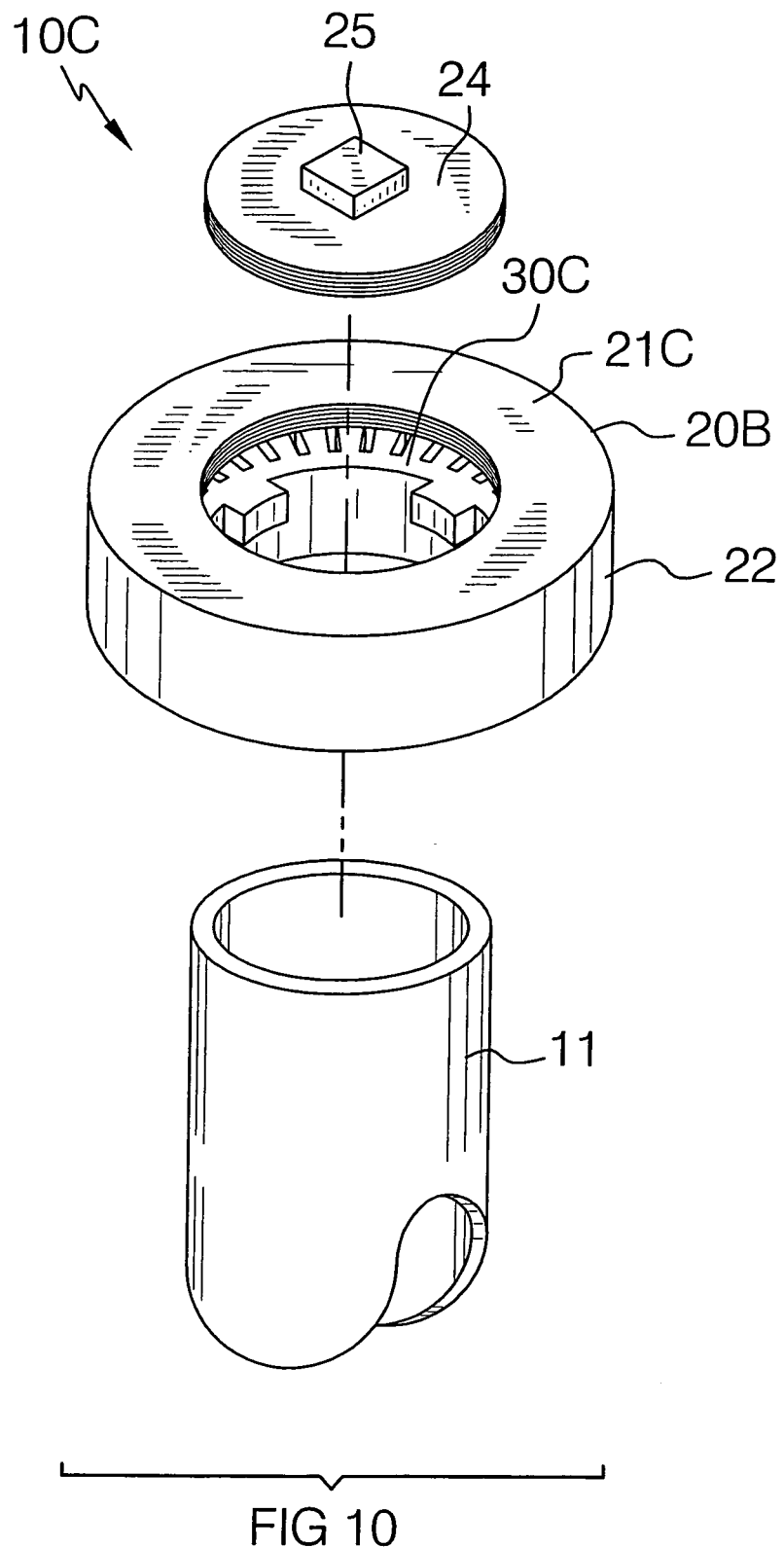
FIG. 10 is an exploded perspective view of the another embodiment shown in FIG. 8.
Figure 10A:
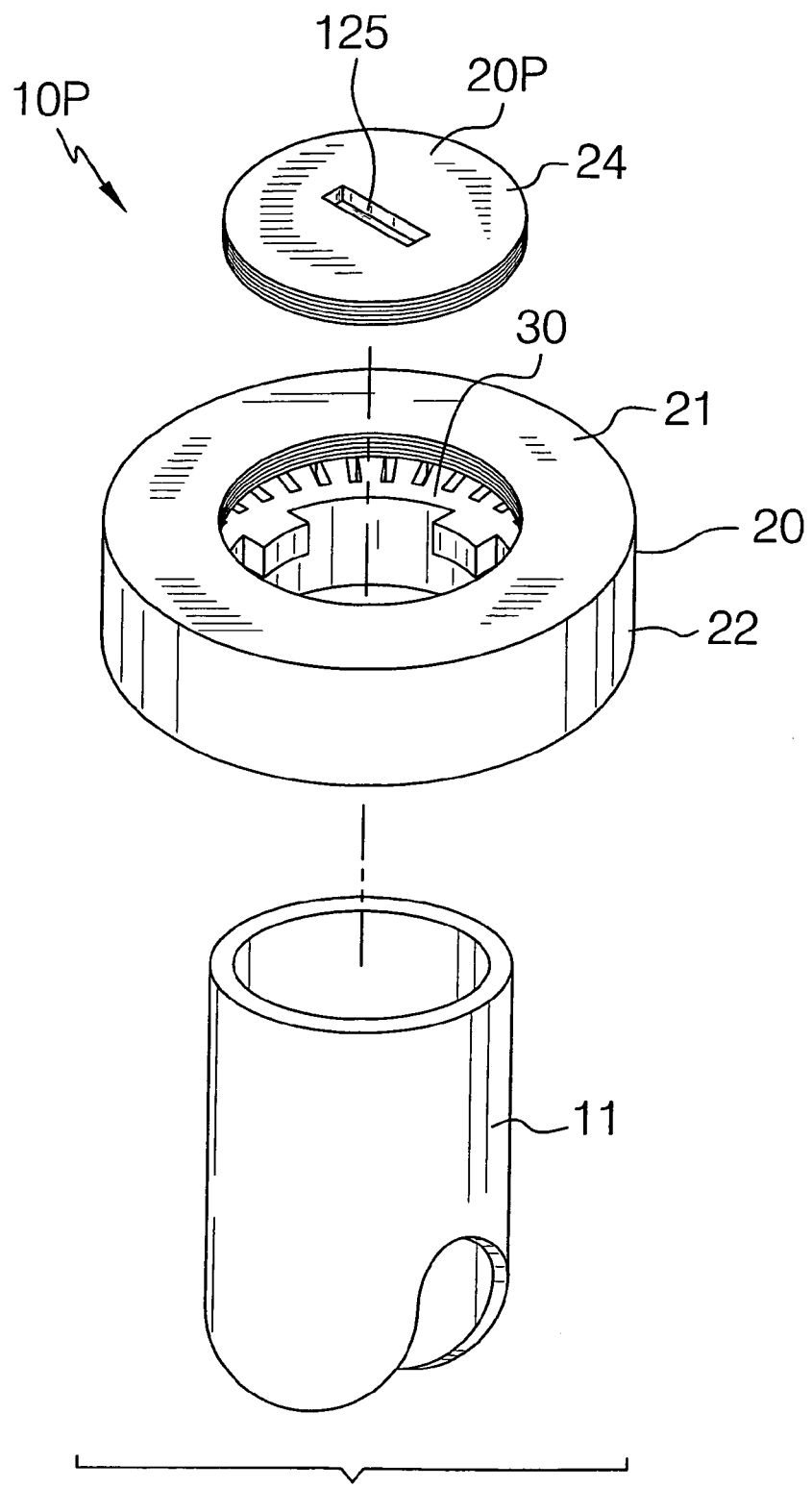
FIG. 10A is an exploded perspective view showing another embodiment of the present invention.

Referring to FIGS. 8 and 10, in another embodiment 10C, the top cap 20C further includes a threaded lid 24 that is removably engaged with the top surface 21C of the top cap 20. Such a threaded lid 24 has a square boss 25 monolithically formed therewith that protrudes axially away from the conduit 11, which is important such that an operator can conveniently remove the threaded lid 24 and advantageously access an interior of the conduit 11 while the top 20C and bottom 30C caps are engaged with the conduit 11. FIG. 10A shows an alternate embodiment 10P wherein the top cap 20P is provided with a countersunk linear slot 125 centrally formed therein. Such a slot 125 is suitably sized and shaped for receiving a conventional screw driver, for example, when tightening and loosening the threaded lid 24.

Figure 9:
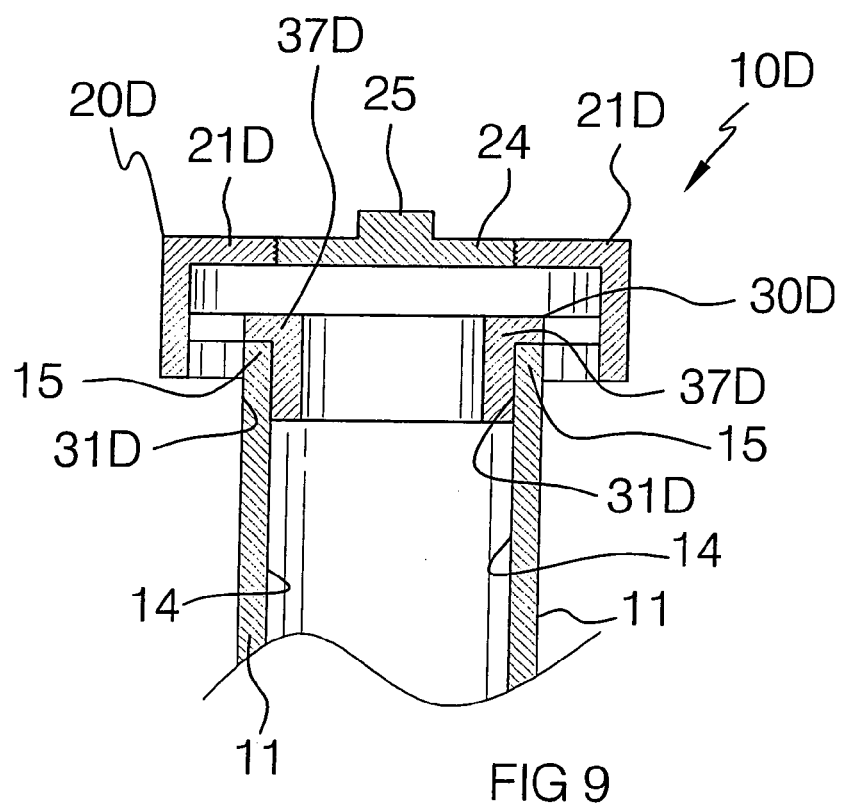
FIG. 9 is a cross-sectional view showing yet another embodiment of the assembly shown in FIG. 3, in accordance with the present invention.

Referring to FIG. 9, in yet another embodiment 10D, the top cap 20D includes a threaded lid 24 that is removably engaged with the top surface 21D of the top cap 20D. Such a threaded lid 24 has a square boss 25 monolithically formed therewith that protrudes axially away from the conduit 11, which is crucial such that an operator can conveniently remove the threaded lid 24 and advantageously access an interior of the conduit 11 while the top 20D and bottom 30D caps are engaged with the conduit. The outer wall 31D of the bottom cap 30D is directly conjoined, without the use of intervening elements, to an inner wall 14 of the conduit 11. Such a bottom cap 30D has a flanged shoulder 37D seated over a top edge 15 of the conduit 11 that terminates at the outer perimeter of the conduit 11 such that the flanged shoulder 37D is flush with the outer perimeter of the conduit 11.

Figure 16:
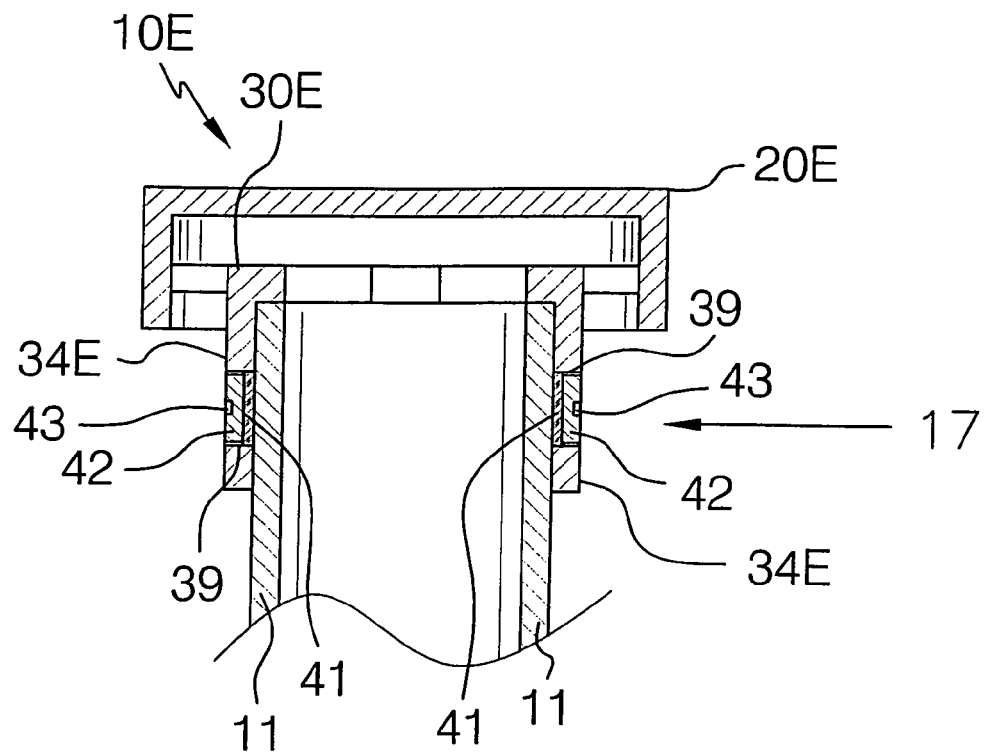
FIG. 16 is a cross-sectional view of the further alternate embodiment shown in FIG. 12, taken along line 16-16.
Figure 17:
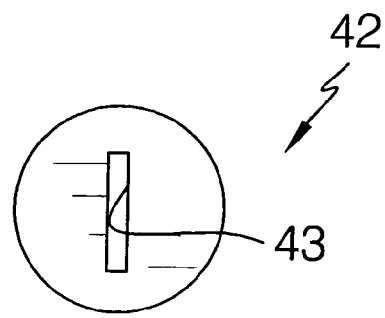
FIG. 17 is a top plan view of the threaded plugs shown FIGS. 11, 12, 13, 14 and 16.

Referring to FIGS. 11, 12, 16 and 17, in a further alternate embodiment 10E, the bottom cap 30E is provided with a pair of diametrically opposed apertures 39 formed in the outer wall 34E thereof. Such apertures 39 pass through an entire thickness of the outer wall 34E and are disposed subjacent to the top cap 20E, which is vital such that the operator can conveniently and effectively access the apertures 39 while the top cap 20E is situated over the bottom cap 30E. The bottom cap 30E further includes a pair of coextensively disc-shaped gaskets 41 that are removably positioned into the apertures 39 and are directly engageable, without the use of intervening elements, with the outer perimeter of the conduit 11. A pair of coextensively shaped threaded plugs 42 are removably affixed directly, without the use of intervening elements, with the apertures 39 respectively such that the pair of gaskets 41 are intercalated between the outer perimeter of the conduit 11 and the pair of plugs 42 respectively, as is best shown in FIGS. 11 and 16. Each of the plugs 42 has a linear slit 43 formed therein that are crucial for advantageously allowing the operator to unscrew the pair of plugs 42 by employing a screwdriver or any other suitable tool.

Figure 13:
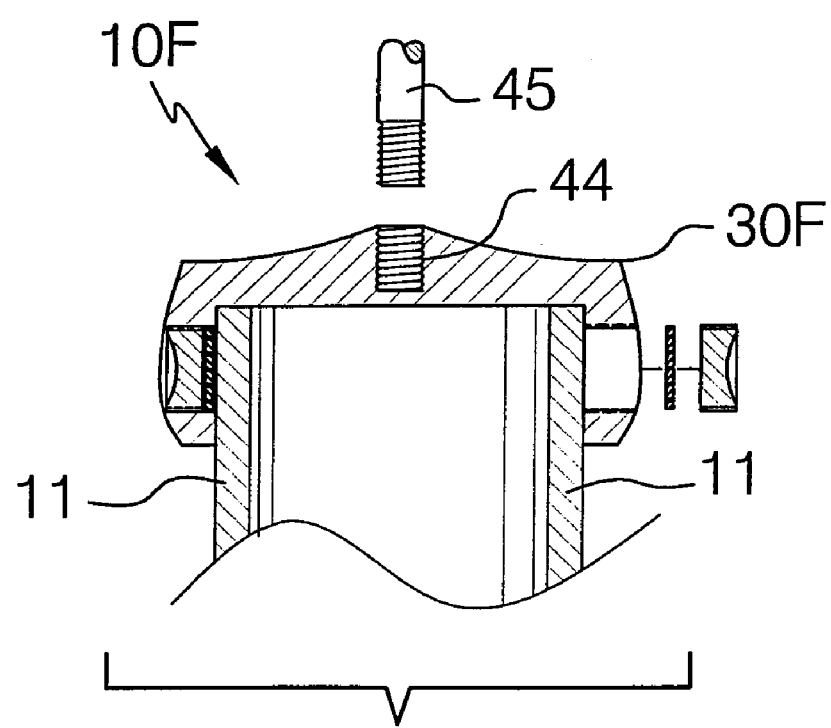
FIG. 13 is a cross-sectional view showing an inspection cap fitting embodiment of the assembly shown in FIG. 11, in accordance with the present invention.
Figure 14:
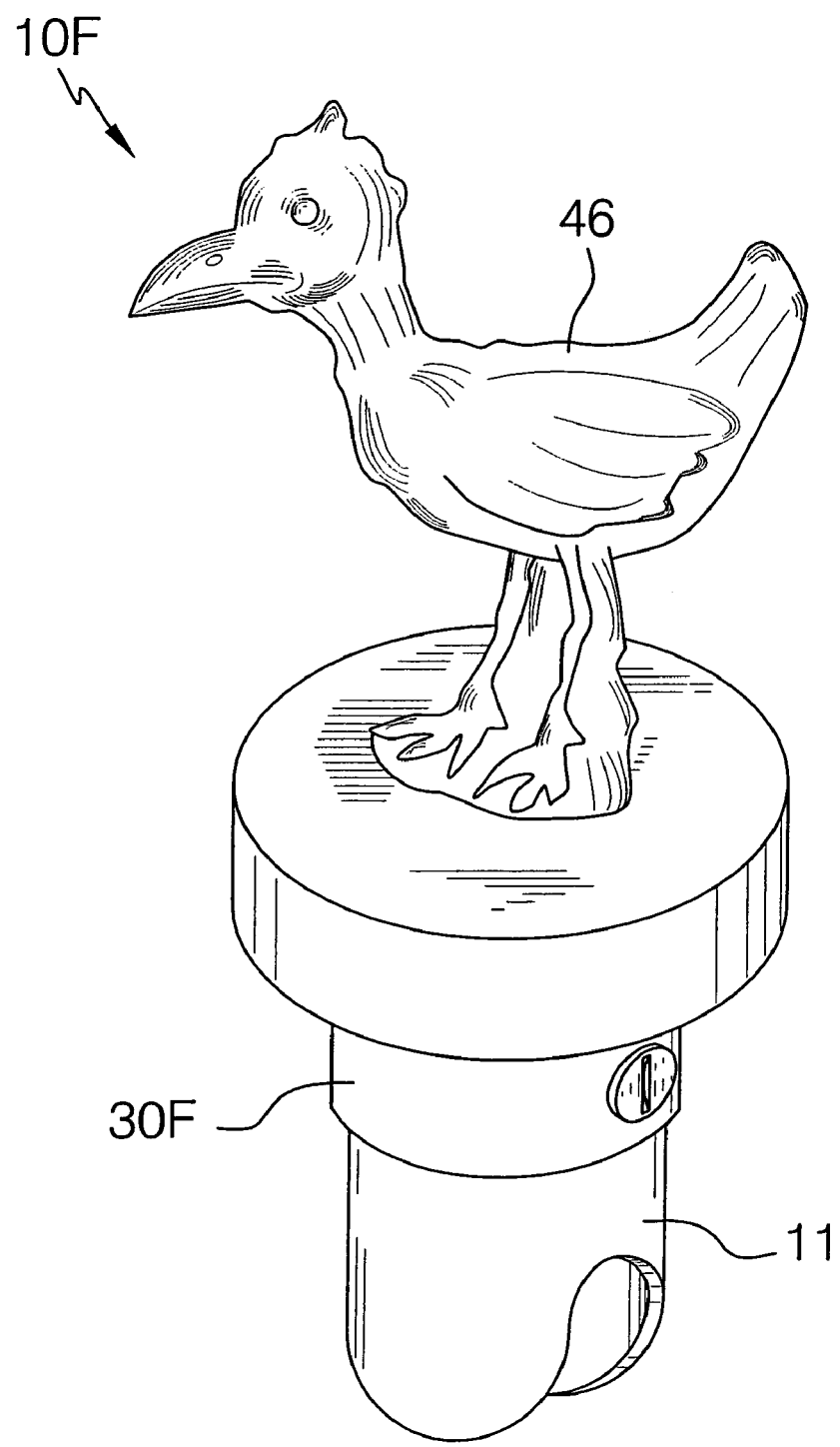
FIG. 14 is a perspective view of the additional embodiment shown in FIG. 13.

Referring to FIGS. 13 and 14, in an additional embodiment 10F, the bottom cap 30F is provided with a threaded aperture 44 for receiving a threaded shaft 45 therein. Such a threaded shaft 45 has a decorative caricature 46 attached thereto that is important for improving the aesthetic appeal of the assembly 10F while also allowing the assembly 10F to be more easily located. Of course, the caricature 46 may be formed to resemble a variety of different garden appropriate themes like birds, animals, mushrooms and gnomes to name a few, as is obvious to a person of ordinary skill in the art. The threaded aperture and shaft 44, 45 can be formed on any of the vent or inspection cap fitting assemblies of the present invention and should not be construed as limited to any one particular embodiment. The bottom cap 30F may also have a flush top without a threaded adapter, as is obvious to one skilled in the art.

Figure 15:
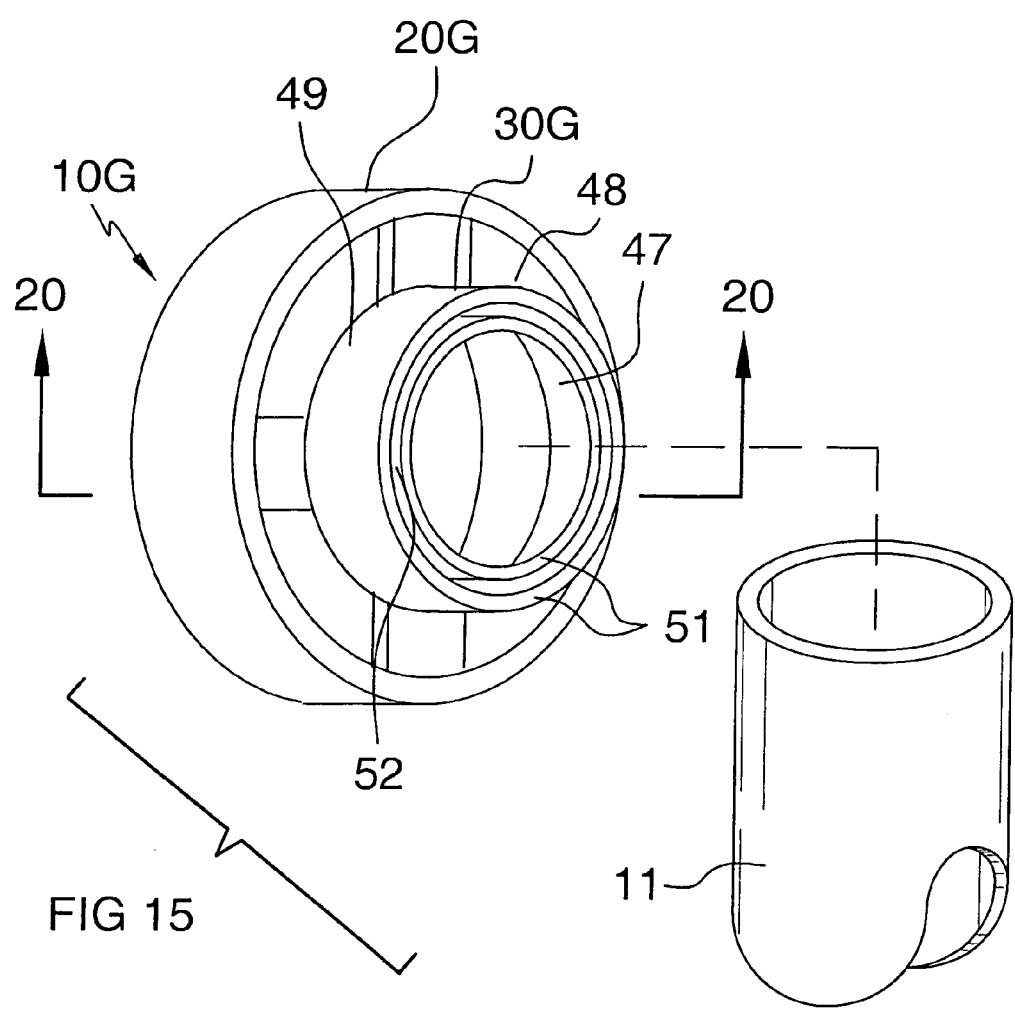
FIG. 15 is a perspective view showing another alternate embodiment of the assembly shown in FIG. 1, in accordance with the present invention.
Figure 20:
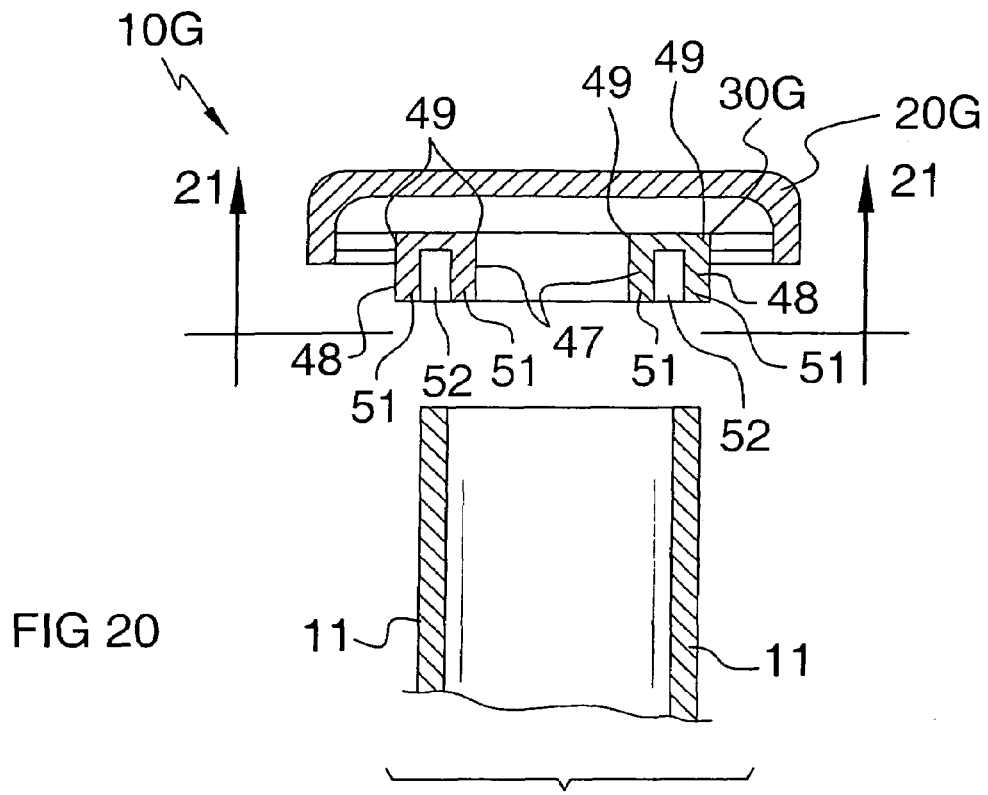
FIG. 20 is cross-sectional view of yet another alternate embodiment shown in FIG. 15, taken along line 20-20.
Figure 21:
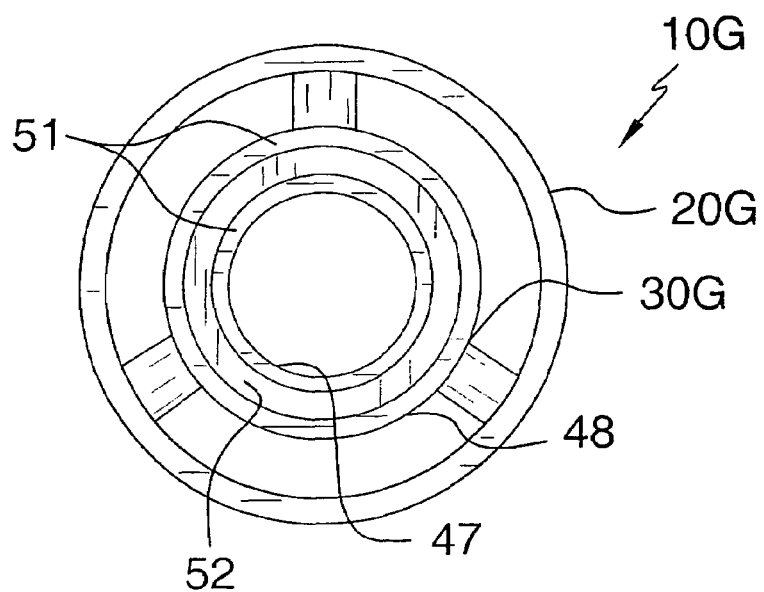
FIG. 21 is a bottom plan view of the assembly shown in FIG. 20, viewed along line 21-21.

Referring to FIGS. 15, 20 and 21, in another alternate embodiment 10G, the bottom cap 30G includes first 47 and second 48 annular sleeves that have axially opposed top 49 and bottom 51 ends. Such first 47 and second 48 annular sleeves are directly and concentrically coupled, without the use of intervening elements, to the top cap 20G such that a continuous and circular gap 52 is formed between the first 47 and second 48 annular sleeves that is crucial for effectively receiving the conduit 11 therebetween.

Figure 19:
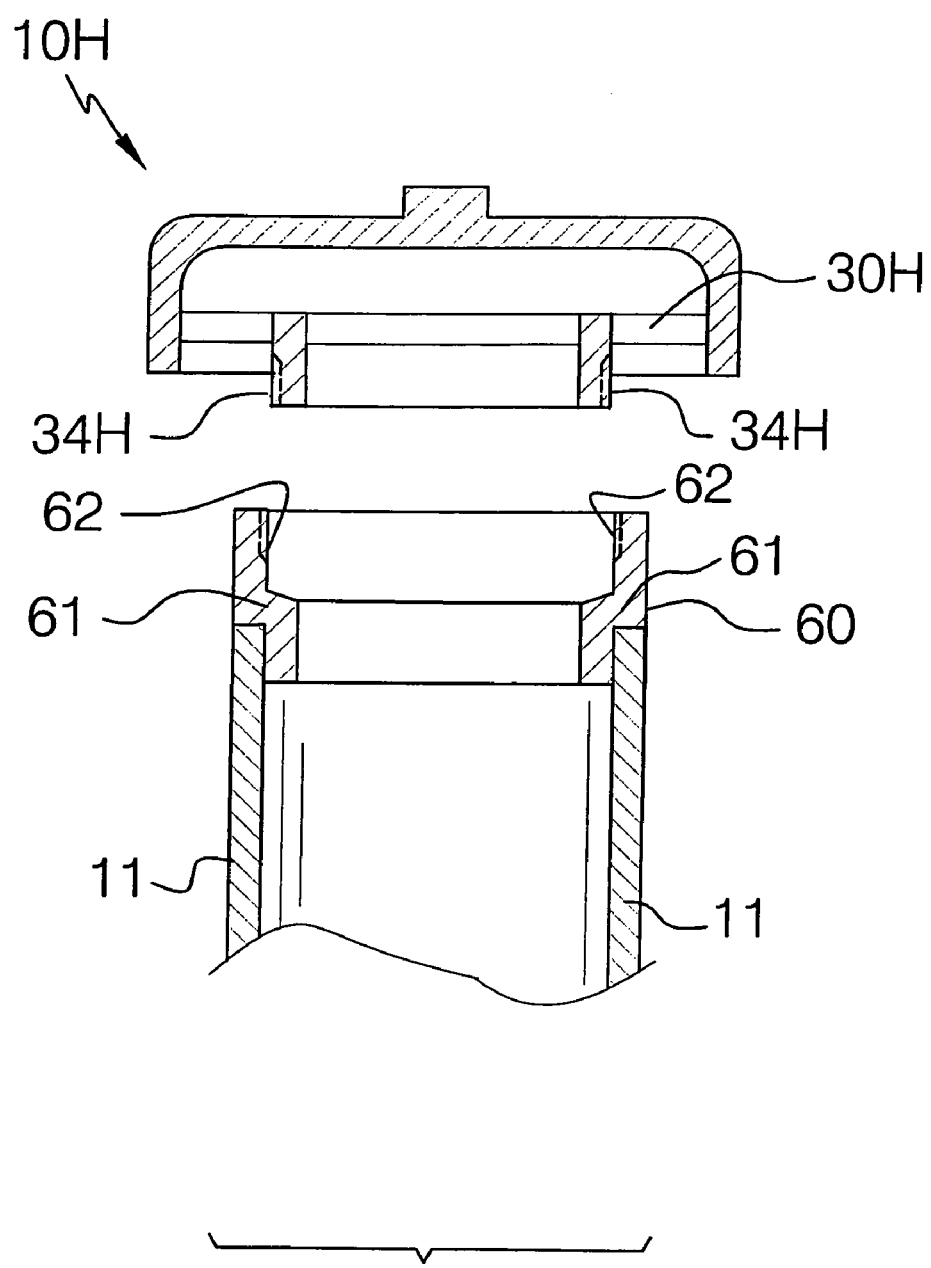
FIG. 19 is a cross-sectional view showing yet another alternate embodiment of the assembly shown in FIG. 1, in accordance with the present invention.

Referring to FIG. 19, in yet another alternate embodiment 10H, the assembly 10H further includes an adapter coupling 60 that is directly mated, without the use of intervening elements, to the conduit 11 and is removably attachable to the bottom cap 30H such that the bottom cap 30H is intercalated between the top cap 20H and the adapter coupling 60 respectively. Such an adapter coupling 60 has an inwardly stepped lower shoulder 61 that is crucial for effectively receiving the bottom cap 30H thereon. The bottom cap 30H has a partially threaded outer wall 34H and the adapter coupling 60 has a partially threaded inner surface 62, wherein the bottom cap 30H and the adapter coupling 60 are threadably matable. The inner shoulder 61 has first and second diameters larger and smaller than the diameter of the bottom cap 30H respectively, which is essential such that the bottom cap 30H is advantageously prohibited from penetrating beyond the second diameter. Such an adapter coupling 60H is important for allowing a user to selective extend the length of the conduit 11 advantageously without having to remove and replace the conduit 11 itself.

Figure 18:
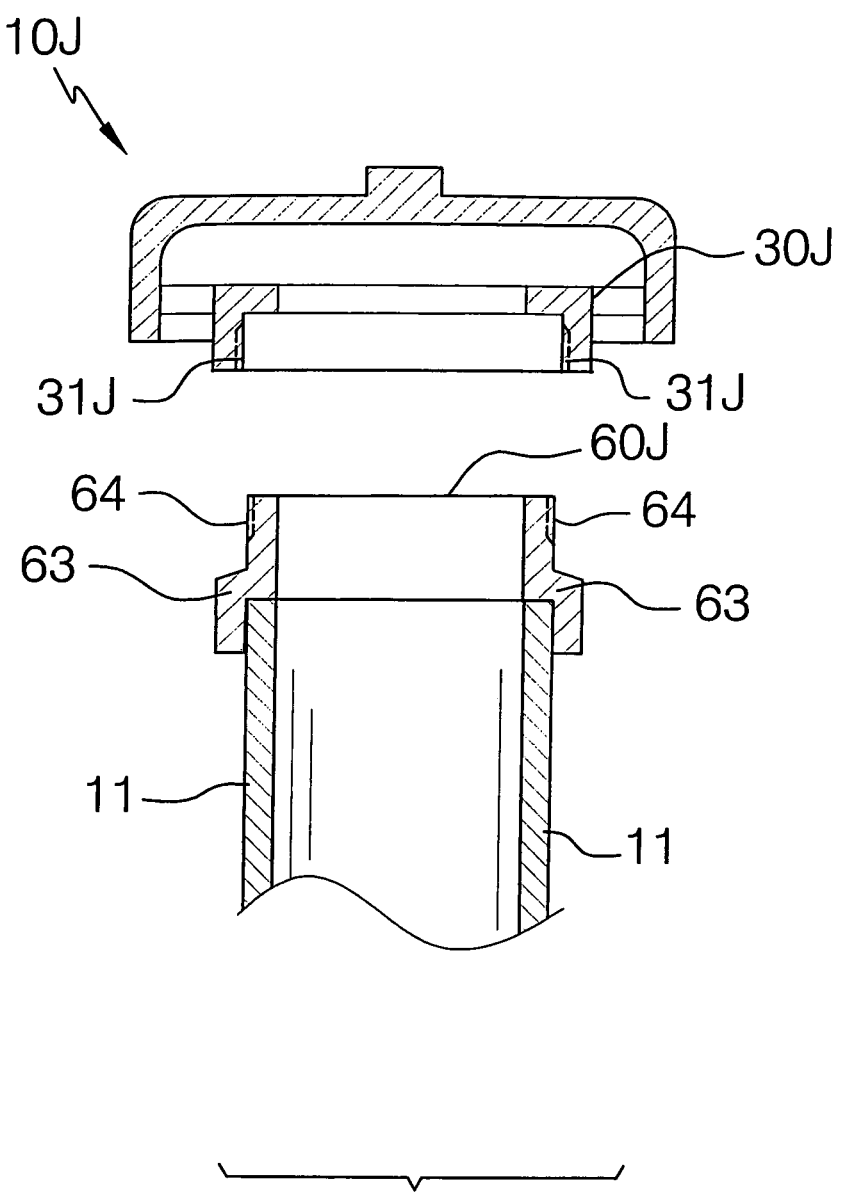
FIG. 18 is a cross-sectional view showing yet a further alternate embodiment of the assembly shown in FIG. 1, in accordance with the present invention.

Referring to FIG. 18, in a yet a further alternate embodiment 10J, the adapter coupling 60J has an outwardly stepped lower shoulder 63 that is crucial for effectively receiving the bottom cap 30J thereon. The bottom cap 30J has a partially threaded inner wall 31J and the adapter coupling 60J has a partially threaded outer surface 64, wherein the bottom cap 30J and the adapter coupling 60J are threadably matable. Such an adapter coupling 60J is important for allowing a user to selective extend the length of the conduit 11 advantageously without having to remove and replace the conduit 11 itself.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A vent cap fitting assembly for covering an exposed septic tank conduit, said inspection cap fitting assembly comprising:

a top cap provided with a diameter greater than a diameter of the conduit, said top cap having a planar top surface spaced above a top opening of the conduit and further having an annular sidewall extending vertically downwardly from said top surface, said sidewall being equidistantly and outwardly spaced about an entire outer perimeter of the conduit; and a bottom cap directly seated on the top opening of the conduit and centrally registered beneath said top cap, said bottom cap having an outer wall directly engaged with the conduit, said outer wall of said bottom cap being equidistantly spaced inward from said outer wall of said top cap such that a gap is formed therebetween for allowing ambient air to flow upwardly between said outer walls of said top and bottom caps respectively and thereafter downwardly through said open top opening of said bottom cap and the conduit respectively;

wherein an interior cavity of the conduit is in fluid communication with the ambient air while said end cap fitting is directly mounted on the conduit;

wherein said bottom cap is provided with a pair of diametrically opposed apertures formed in said sidewall thereof, said apertures passing through an entire thickness of said sidewall and being disposed subjacent said top cap such that the operator can access said apertures while said top cap is situated over said bottom cap, said bottom cap further including a pair of coextensively disc-shaped gaskets removably positioned into said apertures and directly engageable with said outer perimeter of the conduit, and a pair of coextensively shaped threaded plugs removably affixed directly with said apertures respectively such that said pair of gaskets are intercalated between the outer perimeter of the conduit and said pair of plugs respectively, each of said plugs having a linear slit formed therein for allowing the operator to unscrew said pair of plugs by employing a screwdriver.

2. The assembly of claim 1, wherein said outer wall of said bottom cap is directly conjoined to an outer wall of the conduit, said bottom cap having a flanged shoulder seated over a top edge of the conduit and terminating at said outer perimeter of the conduit such that said flanged shoulder is flush with the outer perimeter of the conduit.

3. A combined inspection cap and end cap fitting assembly for covering an exposed septic tank conduit, exposed holding tank conduit, lift pump tank conduit and drain field cells respectively, said combined cap fitting assembly comprising:

a top cap provided with a diameter greater than a diameter of the conduit, said top cap having a planar top surface spaced above a top opening of the conduit and further having an annular sidewall extending vertically downwardly from said top surface, said sidewall being equidistantly and outwardly spaced about an entire outer perimeter of the conduit; and a bottom cap directly seated on the top opening of the conduit and centrally registered beneath said top cap, said bottom cap having an outer wall directly engaged with the conduit, said outer wall of said bottom cap being equidistantly spaced inward from said outer wall of said top cap such that a gap is formed therebetween for allowing ambient air to flow upwardly between said outer walls of said top and bottom caps respectively and thereafter downwardly through said open top opening of said bottom cap and the conduit respectively, said outer wall of said bottom cap terminating subjacent of said sidewall of said top cap;

wherein an interior cavity of the conduit is in fluid communication with the ambient air while said end cap fitting is directly mounted on the conduit;

wherein said bottom cap is provided with a pair of diametrically opposed apertures formed in said sidewall thereof, said apertures passing through an entire thickness of said sidewall and being disposed subjacent said top cap such that the operator can access said apertures while said top cap is situated over said bottom cap, said bottom cap further including a pair of coextensively disc-shaped gaskets removably positioned into said apertures and directly engageable with said outer perimeter of the conduit, and a pair of coextensively shaped threaded plugs removably affixed directly with said apertures respectively such that said pair of gaskets are intercalated between the outer perimeter of the conduit and said pair of plugs respectively, each of said plugs having a linear slit formed therein for allowing the operator to unscrew said pair of plugs by employing a screwdriver;

wherein said plugs remain spaced from said outer perimeter of said conduit and have respective thickness that are greater than respective thicknesses of said gaskets.

4. The assembly of claim 3, wherein said outer wall of said bottom cap is directly conjoined to an outer wall of the conduit, said bottom cap having a flanged shoulder seated over a top edge of the conduit and terminating at said outer perimeter of the conduit such that said flanged shoulder is flush with the outer perimeter of the conduit.

\* \* \* \* \*